US011873673B2

(12) United States Patent
Kashiwaguma et al.

(10) Patent No.: US 11,873,673 B2
(45) Date of Patent: Jan. 16, 2024

(54) SINGLE-AXIS HINGE

(71) Applicant: SUGATSUNE KOGYO CO., LTD., Tokyo (JP)

(72) Inventors: Kazuaki Kashiwaguma, Tokyo (JP); Shuu Shimizu, Tokyo (JP); Naoya Iwata, Tokyo (JP)

(73) Assignee: SUGATSUNE KOGYO CO., LTD., Tokyo (JP)

( * ) Notice: Subject to any disclaimer, the term of this patent is extended or adjusted under 35 U.S.C. 154(b) by 62 days.

(21) Appl. No.: 17/753,166

(22) PCT Filed: Jul. 29, 2020

(86) PCT No.: PCT/JP2020/028995
§ 371 (c)(1),
(2) Date: Feb. 22, 2022

(87) PCT Pub. No.: WO2021/039254
PCT Pub. Date: Mar. 4, 2021

(65) Prior Publication Data

US 2022/0298841 A1 Sep. 22, 2022

(30) Foreign Application Priority Data

Aug. 30, 2019 (JP) ................................ 2019-158940

(51) Int. Cl.
*E05F 3/20* (2006.01)

(52) U.S. Cl.
CPC ............ *E05F 3/20* (2013.01); *E05Y 2900/20* (2013.01)

(58) Field of Classification Search
CPC ............................... E05F 3/20; E05Y 2900/20
See application file for complete search history.

(56) References Cited

U.S. PATENT DOCUMENTS 324,444 A * 8/1885 Wolf .................... F25D 23/028 16/322
RE28,786 E * 4/1976 MacDonald ........ E05D 11/1014 16/327
(Continued)

FOREIGN PATENT DOCUMENTS

CN 105781300 A 7/2016
CN 106030130 A 10/2016
(Continued)

OTHER PUBLICATIONS

CNIPA/CN, Chinese Office Action dated Dec. 9, 2023 in Chinese Patent Application No. CN202080059388.6, 7 pages.
(Continued)

*Primary Examiner* — Victor D Batson
*Assistant Examiner* — Matthew J Sullivan
(74) *Attorney, Agent, or Firm* — Masuvalley & Partners; Peter Martinez

(57) ABSTRACT

Provided is a single-axis hinge with a damper mechanism and a catch mechanism for allowing either one of a first member and a second member to be attached to a portion having a small attachment space. The single-axis hinge (2) includes the first member (11) attached to the main body, and the second member (12) which is attached to the door and can rotate with respect to the first member (11) around a shaft (13) facing a vertical direction. The catch mechanism (6) has a spring (8) and gives rotational force in a closing direction to the door in the vicinity of a closed position. The damper mechanism (7) has a linear damper (9) and damps rotation of the door when the door is closed. The catch mechanism (6) and the damper mechanism (7) are disposed on either one of the first member (11) and the second member (12).

8 Claims, 12 Drawing Sheets

(a)

(b)

(56) References Cited

U.S. PATENT DOCUMENTS

| | | | | | |
|---|---|---|---|---|---|
| 4,987,640 | A * | 1/1991 | Lin | E05D 11/1014 16/327 |
| 5,412,842 | A * | 5/1995 | Riblett | E05D 5/12 16/322 |
| 5,765,263 | A * | 6/1998 | Bolinas | E05D 11/105 16/342 |
| 6,442,800 | B1 * | 9/2002 | Morawetz | E05D 11/087 16/337 |
| 6,553,625 | B2 * | 4/2003 | Lin | E05F 1/1215 16/342 |
| 7,065,833 | B2 * | 6/2006 | Kropf | E05D 3/142 16/294 |
| 7,395,580 | B2 * | 7/2008 | Brustle | E05F 5/006 16/50 |
| 7,600,295 | B2 * | 10/2009 | Zimmer | F16F 9/36 16/85 |
| 7,900,319 | B2 * | 3/2011 | Bacchetti | E05F 3/20 16/382 |
| 7,917,994 | B2 * | 4/2011 | Bai | E05D 11/105 16/334 |
| 8,186,014 | B2 * | 5/2012 | Pecar | E05D 3/142 16/374 |
| 8,418,317 | B2 * | 4/2013 | Wu | E05F 5/006 16/50 |
| 8,490,248 | B2 * | 7/2013 | Chen | H05K 5/0226 16/292 |
| 9,127,876 | B2 * | 9/2015 | Wilson | F25D 23/02 |
| 10,280,671 | B2 * | 5/2019 | Kirenci | E05F 5/02 |
| 10,337,229 | B2 * | 7/2019 | Beattie | E05F 3/20 |
| 11,365,574 | B2 * | 6/2022 | Hotomi | E05F 1/14 |
| 2012/0079682 | A1 * | 4/2012 | Cheng | E05D 11/1064 16/252 |
| 2020/0318411 | A1 * | 10/2020 | Pecar | E05F 3/20 |
| 2022/0081948 | A1 * | 3/2022 | Xue | E05F 3/20 |
| 2022/0106824 | A1 * | 4/2022 | Iijima | E05F 1/061 |
| 2022/0186539 | A1 * | 6/2022 | Xue | E05D 5/0246 |

FOREIGN PATENT DOCUMENTS

| | | | |
|---|---|---|---|
| CN | 106232923 | A | 12/2016 |
| CN | 109099053 | A | 3/2021 |
| EP | 3181787 | A1 | 6/2017 |
| JP | 2009-121169 | A | 6/2009 |
| JP | 2020-63556 | A | 4/2020 |

OTHER PUBLICATIONS

WIPO, Japanese International Search Authority, International Search Report (with English translation) dated Sep. 15, 2020 in International Patent Application No. PCT/JP2020/028995, 5 pages.

WIPO, Japanese International Search Authority, International Written Opinion dated Sep. 15, 2020 in International Patent Application No. PCT/JP2020/028995, 4 pages.

* cited by examiner (a)

(b)

(a)

(b)

(c)

(a)

(b)

(a)

(b)

(c)

SINGLE-AXIS HINGE

RELATED APPLICATIONS

This application is the U.S. National Phase of and claims priority to International Patent Application No. PCT/JP2020/028995, International Filing Date Jul. 29, 2020; which claims benefit of Japanese Patent Application No. 2019-158940 filed Aug. 30, 2019; both of which are incorporated herein by reference in their entireties.

TECHNICAL FIELD

The present invention relates to a single-axis hinge whose first member and second member relatively rotate around a shaft substantially facing a vertical direction.

BACKGROUND ART

As this kind of the single-axis hinge, patent document 1 discloses a single-axis hinge which couples a pair of adjacent door panels of a folding door so that the pair of adjacent door panels can be opened and closed. A first member of the single-axis hinge is attached to one of the pair of doors and a second member is attached to the other one of the pair of doors.

A catch mechanism and a damper mechanism are incorporated in the single-axis hinge described in the patent document 1. The catch mechanism has a spring and gives rotational force in a closing direction to the pair of door panels in the vicinity of a closed position. Due to this catch mechanism, it is possible to keep the closed position of the pair of door panels.

The damper mechanism has a linear damper and damps rotation of the pair of door panels when the pair of door panels are closed. Due to the damper mechanism, it is possible to absorb impact when the pair of doors are closed.

PRIOR ART DOCUMENT

Patent Document

Patent document 1: JP 2009-121169A

SUMMARY OF THE INVENTION

Problem to be Solved by the Invention

However, in the conventional single-axis hinge, since the catch mechanism is disposed on the first member and the damper mechanism is disposed on the second member, sizes of both of the first member and the second member increase. For this reason, there is a problem that it is difficult to attach the first member or the second member to a portion having a small attachment space such as a small opening of a door or a main body, within a thickness of the door or the main body, or the like.

The present invention has been made in view of the above-described problem. Thus, it is an object of the present invention to provide a single-axis hinge with a damper mechanism and a catch mechanism for allowing a first member or a second member to be attached to a portion having a small attachment space such as a small opening of a door or a main body, within a thickness of the door or the main body, or the like.

Means for Solving the Problem

In order to solve the above-described problem, one aspect of the present invention relates to a single-axis hinge comprising: a first member attached to a main body; a second member which is attached to a door and can rotate with respect to the first member around a shaft facing a vertical direction; a catch mechanism having a spring and giving rotational force in a closing direction to the door in the vicinity of a closed position; and a damper mechanism having a linear damper and damping rotation of the door when the door is closed, wherein the catch mechanism and the damper mechanism are disposed on either one of the first member and the second member.

Effect of the Invention

According to the present invention, since the catch mechanism and the damper mechanism are disposed on either one of the first member and the second member, it is possible to attach the other one of the first member and the second member to a portion having a small attachment space such as a small opening of the door or the main body, within a thickness of the door or the main body, or the like.

DETAILED DESCRIPTION OF THE INVENTION

Hereinafter, single-axis hinges according to embodiments of the present invention will be described in detail based on the accompanying drawings. It should be noted that the single-axis hinge of the present invention can be embodied in various aspects and is not limited to the embodiments described in the specification. The present embodiments are provided with the intention for sufficiently providing the disclosure of the specification to enable a person having ordinary skill in the art to fully understand the scope of the invention

First Embodiment

Figure 1:
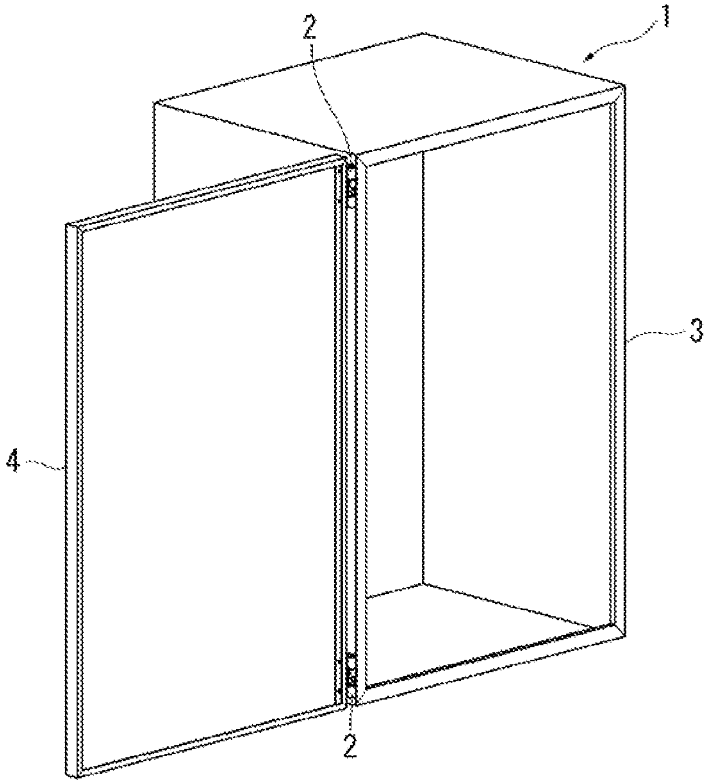
FIG. 1 is a perspective view of a cabinet incorporating a single-axis hinge according to a first embodiment of the present invention (FIG. 1(*a*) shows an opened position of a door and FIG. 1(*b*) shows a closed position of the door).
Figure 1:
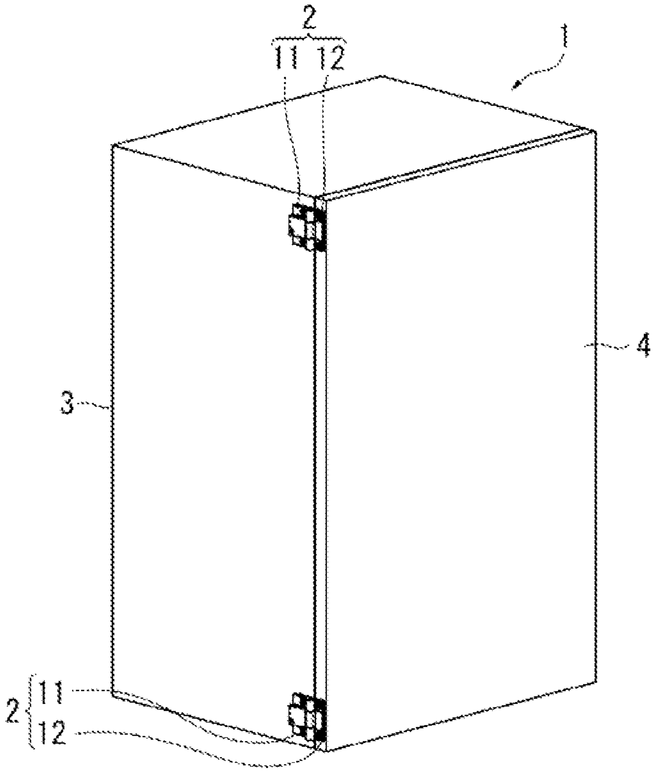

FIGS. 1(*a*) and 1(*b*) show perspective views of a cabinet 1 incorporating a single-axis hinge 2 according to a first embodiment of the present invention. FIG. 1(*a*) shows an opened position of a door 4 and FIG. 1(*b*) shows a closed position of the door 4. The reference number "3" refers to a housing of a cabinet as a main body and the reference number "4" refers to a door.

The single-axis hinge 2 includes a first member 11 and a second member 12. The first member 11 is attached to an outer surface (an outer surface of a side plate) of the housing 3. The second member 12 is attached to a small opening of the door 4 (an end portion in a width direction of the door 4). The door 4 and the housing 3 are coupled to each other by the single-axis hinge 2 so as to be rotatable around a shaft facing a vertical direction.

Figure 2:
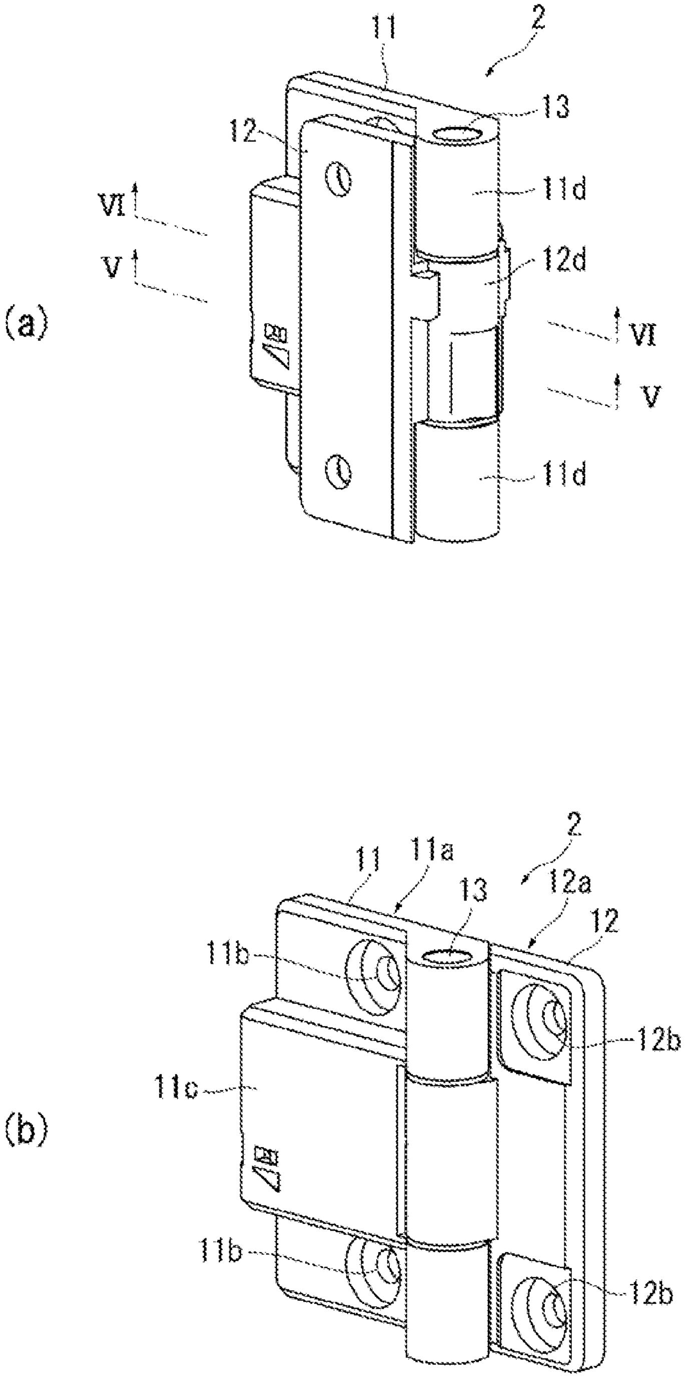
FIG. 2 is a perspective view of the single-axis hinge (FIG. 2(*a*) shows the single-axis hinge when the door is in the opened position and FIG. 2(*b*) shows the single-axis hinge when the door is in the closed position).

FIGS. 2(*a*) and 2(*b*) are perspective views of the single-axis hinge 2 of the present embodiment. FIG. 2(*a*) shows the single-axis hinge 2 when the door 4 is in the opened position and FIG. 2(*b*) shows the single-axis hinge 2 when the door 4 is in the closed position. As shown in FIG. 2(*a*), when the door 4 is in the opened position, the first member 11 and the second member 12 are in a folded state. As shown in FIG. 2(*b*), when the door 4 is in the closed position, the first member 11 and the second member 12 are in an unfolded state. In the unfolded state, an attachment surface 11*a* of the first member 11 and an attachment surface 12*a* of the second member 12 are parallel to each other or substantially coplanar with each other. When the door 4 is closed, the first member 11 and the second member 12 transition from the folded state shown in FIG. 2(*a*) to the unfolded state shown in FIG. 2(*b*).

As shown in FIG. 2(*b*), attachment portions 11*b* such as through holes for attaching the first member 11 to the housing 3 by fastening members are formed in the first member 11. A containing portion 11*c* for a catch mechanism and a damper mechanism described later is formed on the first member 11. Attachment portions 12*b* such as through holes for attaching the second member 12 to the door 4 by fastening members are formed in the second member 12. Any containing portion for the catch mechanism and the damper mechanism is not formed on the second member 12 and the second member 12 has a plate-like shape.

As shown in FIG. 2(*a*), a pair of cylindrical portions 11*d* through which a shaft 13 facing the vertical direction is inserted is formed on the first member 11. A cylindrical portion 12*d* through which the shaft 13 is inserted is formed on the second member 12. The cylindrical portion 12*d* of the second member 12 is disposed between the pair of cylindrical portions 11*d* of the first member 11. The first member 11 and the second member 12 are coupled to each other through the shaft 13 so that the first member 11 and the second member 12 can relatively rotates with respect to each other.

Figure 3:
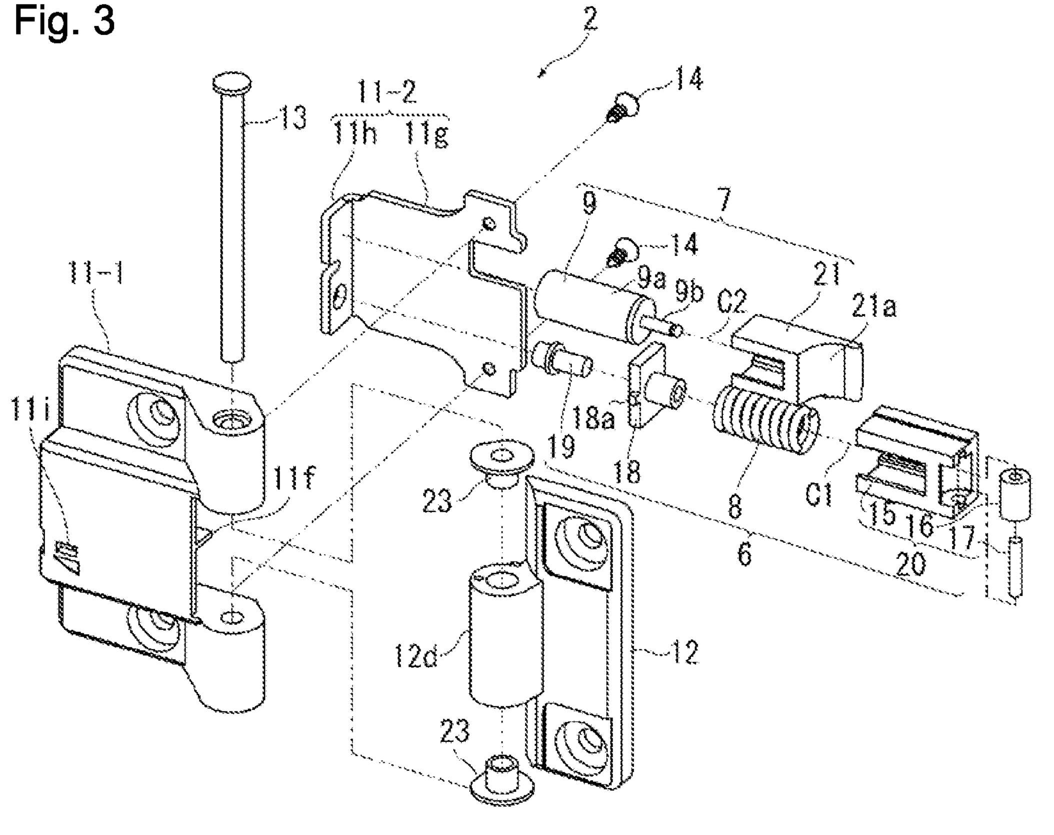
FIG. 3 is a front-side exploded perspective view of the single-axis hinge.
Figure 4:
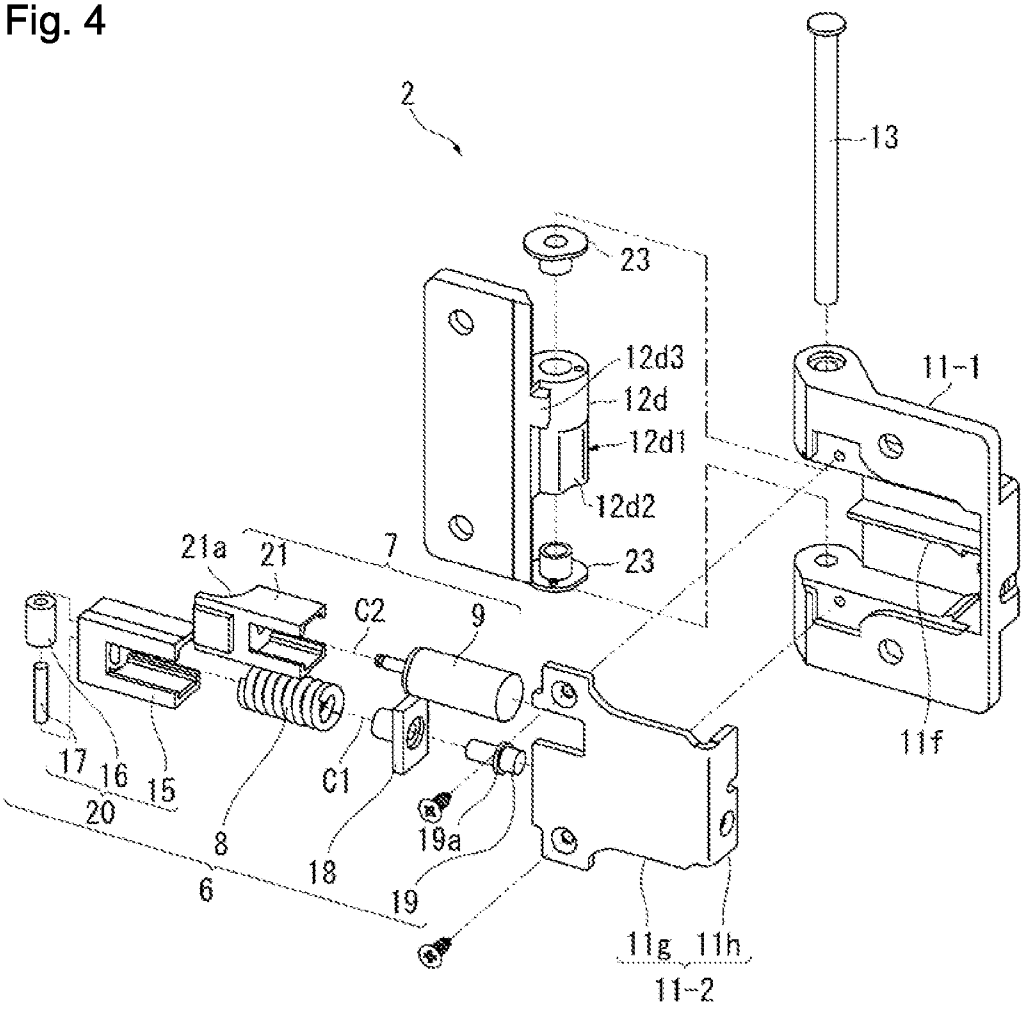
FIG. 4 is a rear-side exploded perspective view of the single-axis hinge.

FIG. 3 and FIG. 4 show exploded perspective views of the single-axis hinge 2. FIG. 3 shows a front-side exploded perspective view and FIG. 4 shows a rear-side exploded perspective view. The reference number "6" refers to the catch mechanism and the reference number "7" refers to the damper mechanism. The catch mechanism 6 and the damper mechanism 7 are disposed so as to be parallel to the first member 11. A center line C1 of a spring 8 of the catch mechanism 6 and a center line C2 of a linear damper 9 of the damper mechanism 7 are parallel to each other and perpendicular to the shaft 13.

As shown in FIG. 3, the first member 11 includes a main body portion 11-1 made of resin material and a reinforcing portion 11-2 which is made of metallic material and attached to the main body portion 11-1 made of the resin material by fastening members 14. The catch mechanism 6 and the damper mechanism 7 are contained between the main body portion 11-1 and the reinforcing portion 11-2. A containing space for the catch mechanism 6 and the damper mechanism 7 is partitioned by a partition wall 11*f* provided on the main body portion 11-1 (see FIG. 4).

The reinforcing portion 11-2 includes a reinforcing plate 11*g* for forming the containing space and a bent piece 11*h* bent with respect to the reinforcing plate 11*g*. The bent piece 11*h* receives force acting from the spring 8 and force acting from the linear damper 9.

The catch mechanism 6 includes the spring 8, a slider 20 and spring force adjusting means 18, 19. The spring 8 is a coil spring. The slider 20 includes a slider main body 15 formed in a substantially box-like shape. The slider 20 can move in the partitioned containing space. Movement of the slider 20 is guided by the main body portion 11-1 and the reinforcing portion 11-2. The slider 20 is biased onto the outer surface of the cylindrical portion 12*d* by the spring 8. The slider 20 has the slider main body 15. A roller 16 is rotatably provided on one end portion of the slider main body 15 through a shaft 17. This roller 16 contacts with the outer surface of the cylindrical portion 12*d*.

Figure 5:
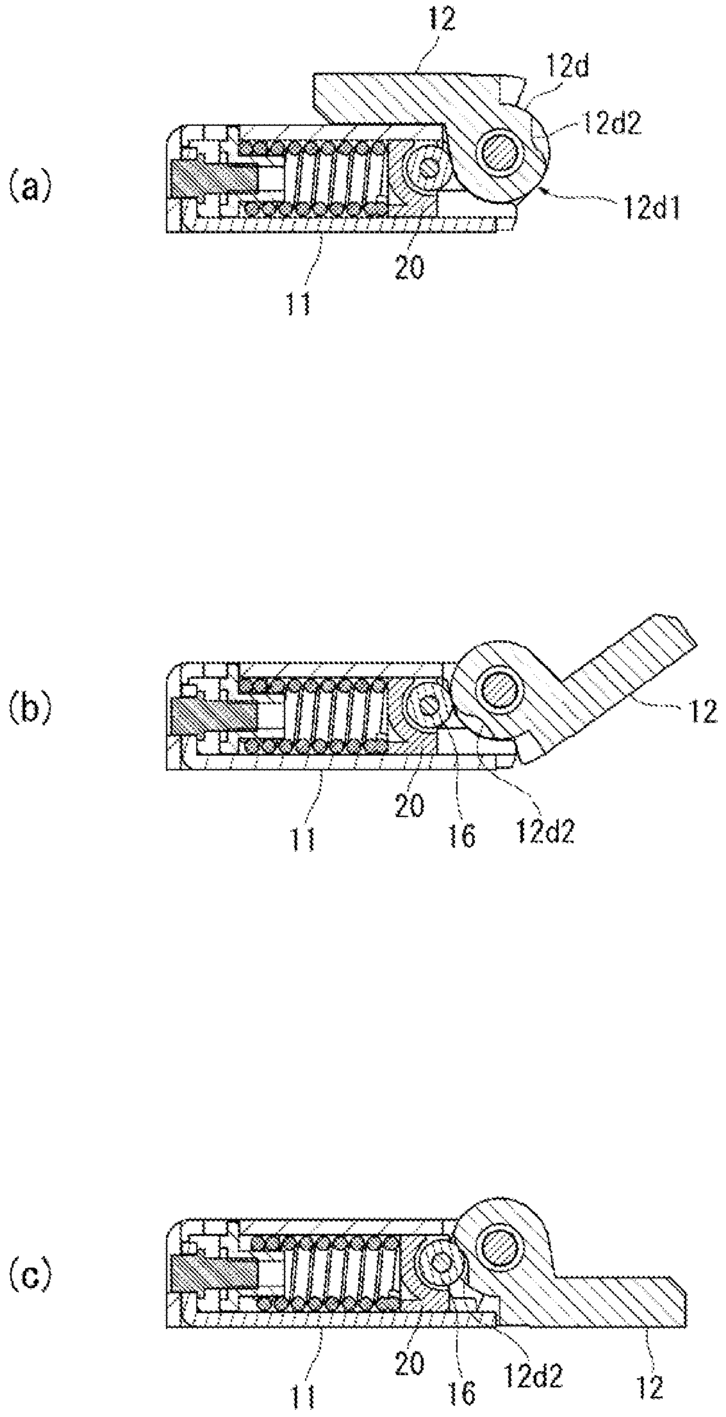
FIG. 5 is an operation view of a catch mechanism (a V-V cross-sectional view of FIG. 2, FIG. 5(*a*) shows an opened position of a second member, FIG. 5(*b*) shows an intermediate position of the second member and FIG. 5(*c*) shows a closed position of the second member).

As shown in FIG. 4, the outer surface of the cylindrical portion 12*d* of the second member 12 has a cylinder portion 12*d*1 (also see FIG. 5(*a*)). A concave portion 12*d*2 functioning as a cam is formed on the outer surface of the cylindrical portion 12*d*. By biasing the roller 16 onto an inclined surface of the concave portion 12*d*2, rotational force in the closing direction acts on the second member 12.

As shown in FIG. 3, the spring force adjusting means 18, 19 includes an adjustment screw 19 and a receiving plate 18 with which the adjustment screw 19 is screwed. The receiving plate 18 receives an end portion of the spring 8. The adjustment screw 19 has a flange 19*a* supported by the bent piece 11*h* (see FIG. 4). When the adjustment screw 19 is rotated, the receiving plate 18 moves in the direction of the center line C1 and thus the spring force of the spring 8 is adjusted. A protrusion 18*a* is formed on the receiving plate 18. The protrusion 18*a* is configured to enter into a window 11*i* of the main body portion 11-1 for allowing a position of the receiving plate 18 to be confirmed from the outside.

The damper mechanism 7 includes the linear damper 9 and a slider 21. A known linear damper for generating damping force when a shaft portion 9*b* moves with respect to a main body portion 9*a* is used as the linear damper 9. Fluid is filled into the main body portion 9*a*. A piston contained in the main body portion 9*a* is provided at the shaft portion 9*b*. A coil spring for returning the shaft portion 9*b* to an extended state is contained in the main body portion 9*a*.

The slider 21 can move in the partitioned containing space. Movement of the slider 21 is guided by the main body portion 11-1 and the reinforcing portion 11-2. The slider 21 has a substantially box-like shape. A curved concave portion 21*a* complementary to the cylinder portion 12*d*1 of the outer surface of the cylindrical portion 12*d* is formed on the slider 21 (also see FIG. 4 and FIG. 6(*a*)).

As shown in FIG. 4, a protrusion 12*d*3 for operating the slider is formed on the outer surface of the cylindrical portion 12*d*. Positions of the protrusion 12*d*3 and the concave portions 12*d*2 are shifted from each other in an axial direction of the cylindrical portion 12*d*. The reference number "23" refers to a bushing through which the shaft 13 is inserted.

FIGS. 5(*a*), 5(*b*) and 5(*c*) show operation views of the catch mechanism 6. FIG. 5(*a*) shows an opened position of the second member 12, FIG. 5(*b*) shows an intermediate position of the second member 12 and FIG. 5(*c*) shows a closed position of the second member 12.

While the second member 12 rotates from the opened position shown in FIG. 5(*a*) to the intermediate position shown in FIG. 5(*b*), the slider 20 of the catch mechanism 6 is biased onto the cylinder portion 12*d*1 of the outer surface of the cylindrical portion 12*d*. During this period, the slider 20 keeps a constant position even if the cylindrical portion 12*d* rotates. Thus, the catch mechanism 6 gives holding force for holding the door 4 at an arbitrary position. Namely, the catch mechanism 6 has a free stop function.

When the second member 12 rotates beyond the intermediate position shown in FIG. 5(*b*) and into the vicinity of the closed position shown in FIG. 5(*c*), the roller 16 of the slider 20 contacts with the inclined surface of the concave portion 12*d*2 and thus the rotational force in the closing direction acts on the second member 12. The rotational force in the closing direction acting on the second member 12 continues until the second member 12 moves to the closed position. Thus, the closed position of the door 4 is kept. Namely, it is possible to allow the catch mechanism 6 to have a catch function.

Figure 6:
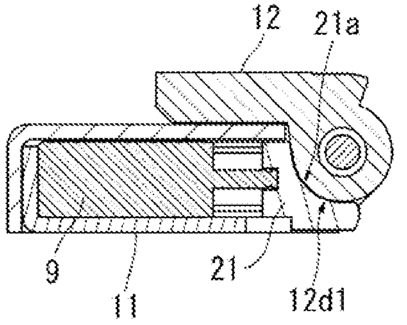
FIG. 6 is an operation view of a damper mechanism (a VI-VI cross-sectional view of FIG. 2, FIG. 6(*a*) shows the opened position of the second member, FIG. 6(*b*) shows the intermediate position of the second member and FIG. 6(*c*) shows the closed position of the second member).
Figure 6:
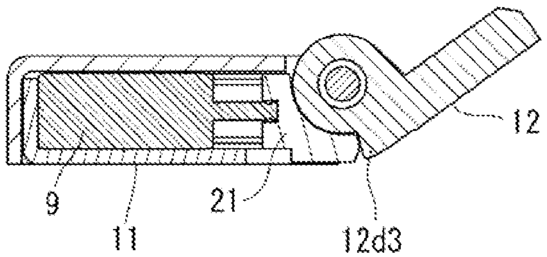
Figure 6:
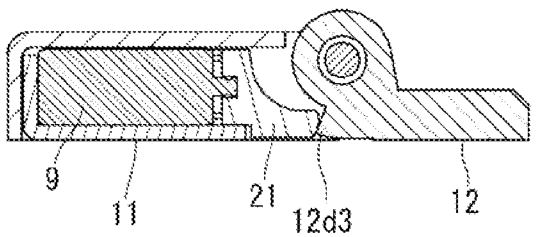

FIGS. 6(*a*), 6(*b*) and 6(*c*) show operation views of the damper mechanism 7. FIG. 6(*a*) shows the opened position of the second member 12, FIG. 6(*b*) shows the intermediate position of the second member 12 and FIG. 6(*c*) shows the closed position of the second member 12.

While the second member 12 rotates from the opened position shown in FIG. 6(*a*) to the intermediate position shown in FIG. 6(*b*), the curved concave portion 21*a* of the slider 21 of the damper mechanism 7 contacts with the cylinder portion 12*d*1 of the outer surface of the cylindrical portion 12*d*. Therefore, during this period, the position of the slider 21 keeps constant.

When the second member 12 further rotates in the closing direction beyond the intermediate position shown in FIG. 6(*b*), the protrusion 12*d*3 of the second member 12 pushes the slider 21 and thus the slider 21 compresses the linear damper 9. As a result, the rotation of the second member 12 is damped and the impact when the door 4 is closed is absorbed. Although it is preferable that the damper mechanism 7 damps the rotation of the second member 12 after the catch mechanism 6 gives the rotational force in the closing direction to the second member 12, this sequence may be reversed.

The configuration of the single-axis hinge 2 of the present embodiment has been described above. According to the single-axis hinge 2 of the present embodiment, the following effects can be obtained.

Since the catch mechanism 6 and the damper mechanism 7 are disposed on the first member 11, it is possible to attach the second member 12 to the small opening of the door 4.

Since the catch mechanism 6 gives the rotational force so as to unfold the first member 11 and the second member 12 in the vicinity of the unfolded state when the first member 11 and the second member 12 transition from the folded state to the unfolded state, it is possible to act the catch force on the door 4 in the vicinity of the closed position even if the single-axis hinge 2 is attached to the outer surface of the cabinet 1.

Since the slider 20 of the catch mechanism 6 is biased onto the cylindrical portion 12*d* having the cylinder portion 12*d*1 and the concave portion 12*d*2, it is possible to allow the catch mechanism 6 to have not only the catch function but also the free stop function.

Since the curved concave portion 21*a* complementary to the cylinder portion 12*d*1 of the outer surface of the cylindrical portion 12*d* is formed on the slider 21 of the damper mechanism 7, it is possible to make the damper mechanism 7 compact.

Since the first member 11 includes the main body portion 11-1 made of the resin material and the reinforcing portion 11-2 made of the metallic material, it is possible to make the first member 11 compact with ensuring necessary strength.

Second Embodiment

Figure 7:
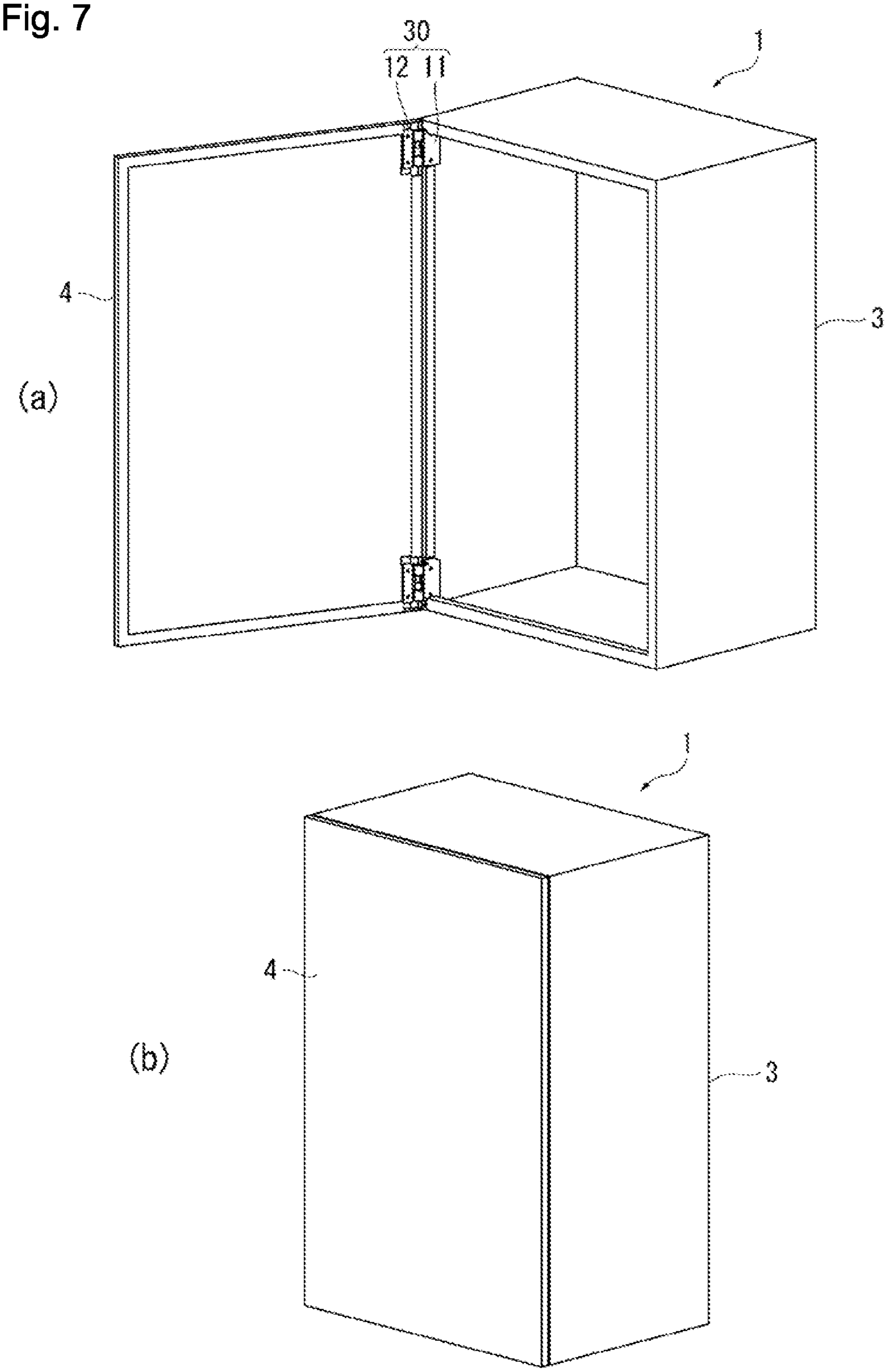
FIG. 7 is a perspective view of a cabinet incorporating a single-axis hinge according to a second embodiment of the present invention (FIG. 7(*a*) shows the opened position of the door and FIG. 7(*b*) shows the closed position of the door).
Figure 8:
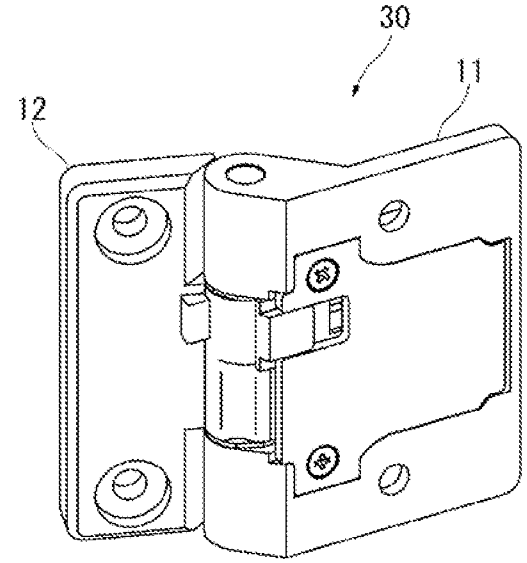
FIG. 8 is a perspective view of the single-axis hinge of the second embodiment (FIG. 8(*a*) shows the single-axis hinge when the door is in the opened position and FIG. 8(*b*) shows the single-axis hinge when the door is in the closed position).
Figure 8:
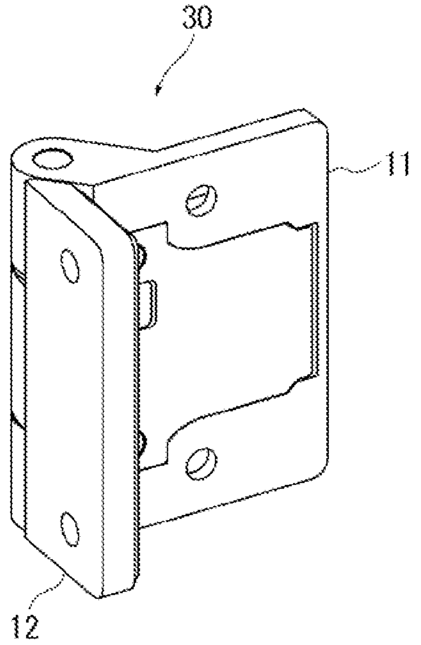

FIGS. 7(*a*) and 7(*b*) show perspective views of the cabinet 1 incorporating a single-axis hinge 30 according to a second embodiment of the present invention. The single-axis hinge 2 of the first embodiment is attached to the outer surface of the cabinet 1, whereas the single-axis hinge 30 of the second embodiment is embedded in the cabinet 1. FIG. 7(*a*) shows the opened position of the door 4 and FIG. 7(*b*) shows the closed position of the door 4. FIGS. 8(*a*) and 8(*b*) show perspective views of the single-axis hinge 30 of the present embodiment. FIG. 8(*a*) shows the single-axis hinge 30 when the door 4 is in the opened position and FIG. 8(*b*) shows the single-axis hinge 30 when the door 4 is in the closed position.

In the first embodiment, when the door 4 is in the opened position, the first member 11 and the second member 12 are in the folded state, and when the door 4 is in the closed position, the first member 11 and the second member 12 are in the unfolded state. On the other hand, in the second embodiment, as shown in FIG. 8(*a*), when the door 4 is in the opened position, the first member 11 and the second member 12 are in the unfolded state, and when the door 4 is in the closed position, the first member 11 and the second member 12 are in the folded state.

Figure 9:
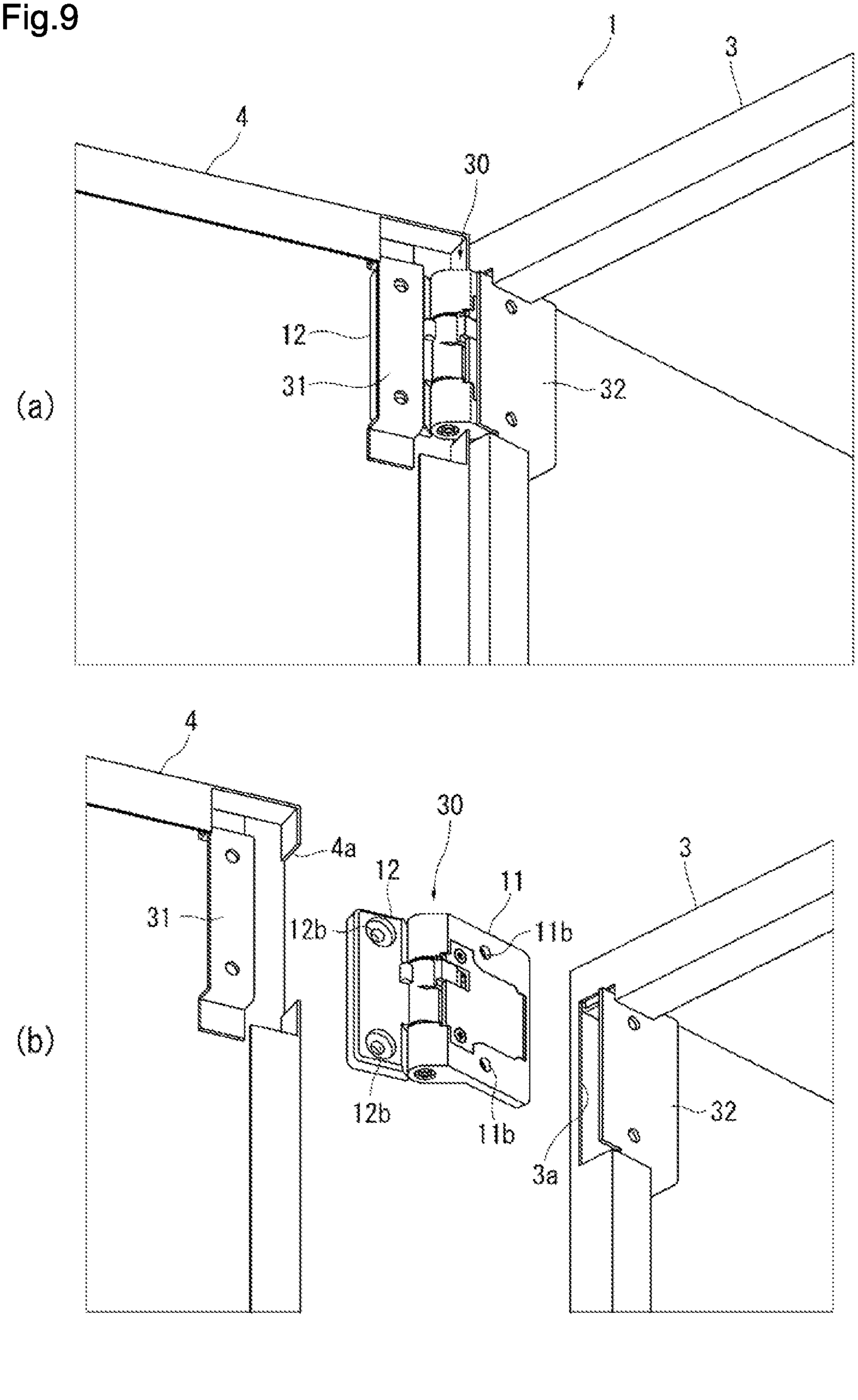
FIG. 9 is a perspective view showing an attached state of the single-axis hinge of the second embodiment (FIG. 9(*a*) shows a perspective view after the attachment and FIG. 9(*b*) shows a perspective view before the attachment).

As shown in the perspective view of FIG. 9(*a*) showing an attached state, the second member 12 is contained within the thickness of the door 4. The bracket 31 is fixed on an inner surface of the door 4 and the second member 12 is inserted between the door 4 and the bracket 31. As shown in FIG. 9(*b*), screw holes 12*b* serving as attachment portions are formed in the second member 12. A notch 4*a* for avoiding interference with the hinge 30 is formed in a frame of the door 4. By inserting the second member 12 between the inner surface of the door 4 and the bracket 31 and fastening the fastening members to the attachment portions 12*b*, the second member 12 is attached to the door 4.

Figure 10:
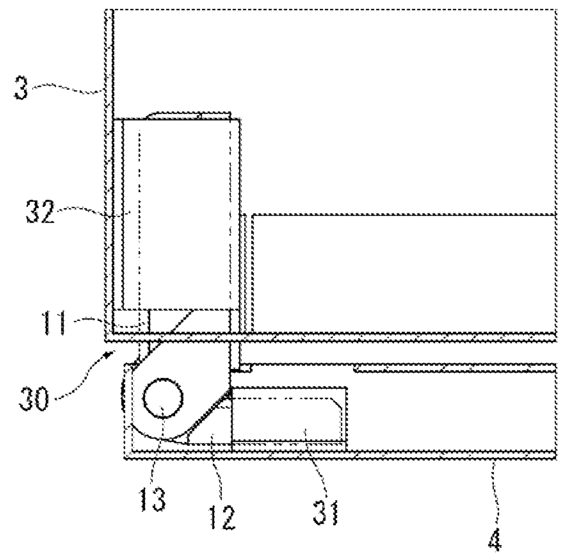
FIG. 10 is a plan view showing the attached state of the single-axis hinge of the second embodiment.

A bracket 32 is fixed on an inner surface of the housing 3 and the first member 11 is inserted between the inner surface of the housing 3 and the bracket 32. Screw holes 11*b* serving as attachment portions are formed in the first member 11. A notch 3*a* through which the first member 11 is inserted is formed in a frame of the housing 3. By inserting the first member 11 between the inner surface of the housing 3 and the bracket 32 and fastening the fastening members to the attachment portions 11*b*, the first member 11 is attached to the housing 3. As shown in the plan view of FIG. 10, the shaft 13 of the single-axis hinge 30 is disposed within the thickness of the door 4.

Since the configuration of each component of the single-axis hinge 30 of the second embodiment is substantially the same as the configuration of each component of the single-axis hinge 2 of the first embodiment except for the points described above, the same reference numbers are respectively attached to the components of the single-axis hinge 30 of the second embodiment and description for them is omitted.

Figure 11:
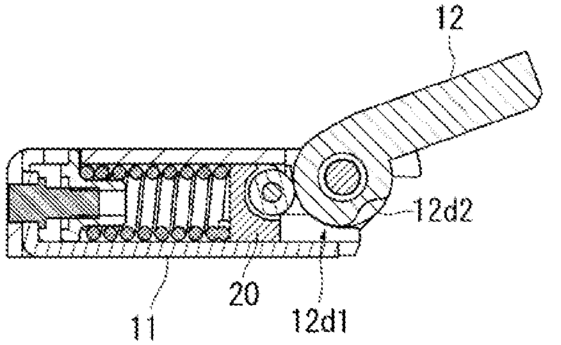
FIG. 11 is an operation view of the catch mechanism (FIG. 11(*a*) shows the opened position of the second member, FIG. 11(*b*) shows the intermediate position of the second member and FIG. 11(*c*) shows the closed position of the second member).
Figure 11:
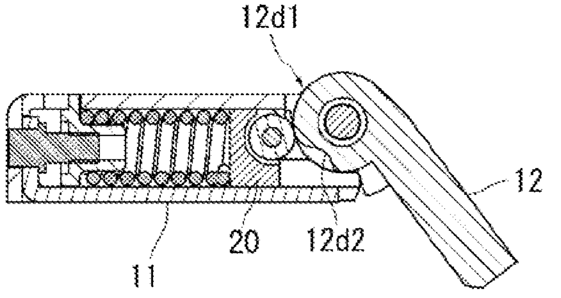
Figure 11:
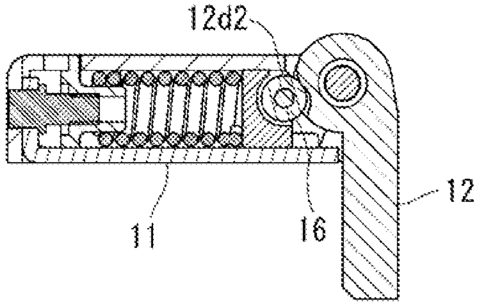

FIGS. 11(*a*), 11(*b*) and 11(*c*) show operation views of the catch mechanism 6 of the single-axis hinge 30 according to the second embodiment. FIG. 11(*a*) shows the opened position of the second member 12, FIG. 11(*b*) shows the intermediate position of the second member 12 and FIG. 11(*c*) shows the closed position of the second member 12.

While the second member 12 rotates from the opened position shown in FIG. 11(*a*) to the intermediate position shown in FIG. 11 (*b*), the slider 20 of the catch mechanism 6 is biased onto the cylinder portion 12*d*1 of the outer surface of the cylindrical portion 12*d*. When the second member 12 rotates beyond the intermediate position shown in FIG. 11(*b*) and into the vicinity of the closed position, the roller 16 of the slider 20 contacts with the inclined surface of the concave portion 12*d*2 as shown in FIG. 11(*c*), and thereby rotational force in the closing direction acts on the second member 12.

Figure 12:
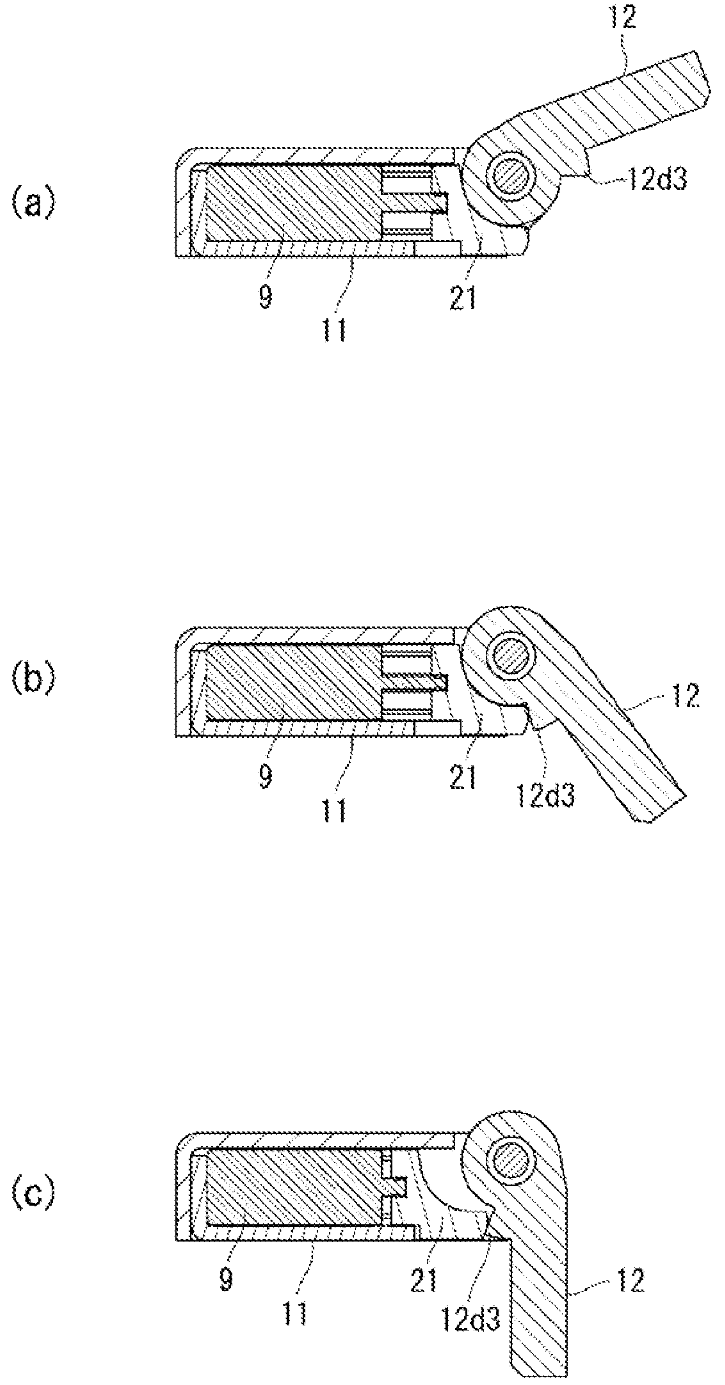
FIG. 12 is an operation view of the damper mechanism (FIG. 12(*a*) is the opened position of the second member, FIG. 12(*b*) is the intermediate position of the second member and FIG. 12(*c*) shows the closed position of the second member).

FIGS. 12(*a*), 12(*b*) and 12(*c*) show operation views of the damper mechanism 7. FIG. 12(*a*) shows the opened position of the second member 12, FIG. 12(*b*) shows the intermediate position of the second member 12 and FIG. 12(*c*) shows the closed position of the second member 12.

While the second member 12 rotates from the opened position shown in FIG. 12(*a*) to the intermediate position shown in FIG. 12(*b*), the position of the slider 21 keeps constant. When the second member 12 further rotates in the closing direction beyond the intermediate position shown in FIG. 6(*b*), the protrusion 12*d*3 of the second member 12 pushes the slider 21 as shown in FIG. 12(*c*), and thereby the slider 21 compresses the linear damper 9. As a result, the rotation of the second member 12 is damped and the impact when the door 4 is closed is absorbed.

In this regard, the present invention is not limited to be embodied according to the above-described embodiments and can be modified to other embodiments without changing the spirit of the present invention.

Although the single-axis hinge is attached to the cabinet in the above-described embodiments, the single-axis hinge may be attached to furniture, a frame of a building, a folding door or the like.

Although the catch mechanism and the damper mechanism are disposed on the first member in the above-described embodiments, the catch mechanism and the damper mechanism may be disposed on the second member if the attachment space of the main body side is small.

The present specification is based on Japanese patent application No. 2019-158940 filed on Aug. 30, 2019. The entire contents of this application are hereby incorporated.

DESCRIPTION OF REFERENCE SINGS

2 . . . Single-axis hinge
3 . . . Housing (main body)
4 . . . Door
6 . . . Catch mechanism
8 . . . Spring
7 . . . Damper mechanism
9 . . . Linear damper
11 . . . First member
11-1 . . . Main body portion
11-2 . . . Reinforcing portion
11*h* . . . Bent piece
12 . . . Second member
12*d* . . . Cylindrical portion
12*d*1 . . . Cylinder portion
12*d*2 . . . concave portion
12*d*3 . . . Protrusion
13 . . . Shaft
20 . . . Slider of the catch mechanism
21 . . . Slider of the damper mechanism
21*a* . . . Curved concave portion
30 . . . Single-axis hinge

What is claimed is:

1. A single-axis hinge comprising:

a first member attached to a main body;

a second member which is attached to a door and can rotate with respect to the first member around a shaft facing a vertical direction;

a catch mechanism having a spring and giving rotational force in a closing direction to the door in the vicinity of a closed position; and a damper mechanism having a linear damper and damping rotation of the door when the door is closed, wherein the catch mechanism and the damper mechanism are disposed on either one of the first member and the second member, an other of the first member and the second member has a cylindrical portion through which the shaft is inserted, a cylinder portion and a concave portion are formed on an outer surface of the cylindrical portion, a protrusion for operating a slider of the damper mechanism is further formed on an outer surface of the cylindrical portion, wherein a curved concave portion complementary to a cylinder portion of the outer surface of the cylindrical portion is formed on the slider of the damper mechanism, and wherein a slider of the catch mechanism is biased onto the outer surface of the cylindrical portion by the spring.

2. The single-axis hinge as claimed in claim 1, wherein the first member includes a main body portion made of resin material and a reinforcing portion made of metallic material and forming a containing space for the catch mechanism and the damper mechanism together with the main body portion, and wherein a bent piece for receiving force acting from the spring and force acting from the linear damper is formed on the reinforcing portion.

3. The single-axis hinge as claimed in claim 1, wherein the first member includes a main body portion made of resin material and a reinforcing portion made of metallic material and forming a containing space for the catch mechanism and the damper mechanism together with the main body portion, and wherein a bent piece for receiving force acting from the spring and force acting from the linear damper is formed on the reinforcing portion.

4. The single-axis hinge as claimed in claim 1, wherein the first member includes a main body portion made of resin material and a reinforcing portion made of metallic material and forming a containing space for the catch mechanism and the damper mechanism together with the main body portion, and wherein a bent piece for receiving force acting from the spring and force acting from the linear damper is formed on the reinforcing portion.

5. A single-axis hinge comprising:

a first member attached to a main body;

a second member which is attached to a door and can rotate with respect to the first member around a shaft facing a vertical direction;

a catch mechanism having a spring and giving rotational force in a closing direction to the door in the vicinity of a closed position; and a damper mechanism having a linear damper and damping rotation of the door when the door is closed, wherein the catch mechanism and the damper mechanism are disposed on either one of the first member and the second member, an other of the first member and the second member has a cylindrical portion through which the shaft is inserted, a cylinder portion and a concave portion are formed on an outer surface of the cylindrical portion, a protrusion for operating a slider of the damper mechanism is further formed on an outer surface of the cylindrical portion, wherein when the first member and the second member transition from a folded state to an unfolded state, the catch mechanism generates rotational force so as to unfold the first member and the second member in the vicinity of the unfolded state, wherein a curved concave portion complementary to a cylinder portion of the outer surface of the cylindrical portion is formed on the slider of the damper mechanism, and wherein a slider of the catch mechanism is biased onto the outer surface of the cylindrical portion by the spring.

6. The single-axis hinge as claimed in claim 5, wherein the first member includes a main body portion made of resin material and a reinforcing portion made of metallic material and forming a containing space for the catch mechanism and the damper mechanism together with the main body portion, and wherein a bent piece for receiving force acting from the spring and force acting from the linear damper is formed on the reinforcing portion.

7. The single-axis hinge as claimed in claim 5, wherein the first member includes a main body portion made of resin material and a reinforcing portion made of metallic material and forming a containing space for the catch mechanism and the damper mechanism together with the main body portion, and wherein a bent piece for receiving force acting from the spring and force acting from the linear damper is formed on the reinforcing portion.

8. The single-axis hinge as claimed in claim 5, wherein the first member includes a main body portion made of resin material and a reinforcing portion made of metallic material and forming a containing space for the catch mechanism and the damper mechanism together with the main body portion, and wherein a bent piece for receiving force acting from the spring and force acting from the linear damper is formed on the reinforcing portion.

* * * * *